INVENTORS
EDWIN E. WESTERFIELD
JERRY R. NORTON
LAUREN J. RUEGER
MALCOLM B. GREENLEE
BY ATTORNEY
AGENT

United States Patent Office 3,369,236
Patented Feb. 13, 1968

3,369,236
NAVIGATIONAL RECEIVER
Edwin E. Westerfield, Silver Spring, Jerry R. Norton, Greenbelt, Lauren J. Rueger, Silver Spring, and Malcolm B. Greenlee, Rockville, Md., assignors to the United States of America as represented by the Secretary of the Navy
Filed May 20, 1966, Ser. No. 551,776
9 Claims. (Cl. 343—100)

ABSTRACT OF THE DISCLOSURE

This is a navigational receiver for receiving signals broadcast continuously from artificial earth satellites, the satellite being a source of reliable all weather navigational information. The receiver may be tuned manually to the internationally known frequency of the satellite and then once contact has been made the receiver locks on to the satellite signal. Another phase of the receiver is that it will automatically scan a band of frequencies in the neighborhood of that used by the satellite so that an audio signal is given once the desired frequency has been passed indicating presence of a satellite whereupon the receiver locks on to this frequency and keeps it in steady contact from then on.

---

This invention relates to receivers and more particularly to a tracking receiver system that is capable of use with navigational satellites and which gives a derivation of accurate time information obtained from the satellite information transmitted to provide accurate time information at any location in the world.

Many electronic devices have entered the field of science of celestial navigation for more accurately determining vehicle position under all types of operational conditions. One such device, for example, uses a light sensitive apparatus that is capable of locking on a star at which it is pointed and with additional computing equipment obtain a continuous indication of position on the earth's surface. One of the inherent disadvantages of this type system is that it is not an all-weather device and will not give accurate readings with even a moderate overcast sky. A system that is not affected by this problem is the satellite navigational system. This system by the use of artificial earth satellites which are equipped with radio transmitters provides a continuous means of providing an all-weather navigational system for a vehicle at any position on the earth's surface. Navigational satellite systems have proven to be the most feasible at the present and with the use of such a system essentially accurate navigational information is obtainable anywhere in the world. One of the most useful types of information given by the satellite is accurate time information. Accurate time determination is necessary for all types of precision navigation and this is especially true whenever a ship is at sea. Time information at the present is usually provided by the marine chronometer in combination with radio aids. The marine chronometer is a highly accurate timepiece that operates at a reasonably constant rate, but since a marine chronometer is a mechanical device it usually requires a periodical check to insure that it is operating properly.

The instant invention is to a receiver apparatus that is capable of automatically tracking a navigational satellite that is transmitting time information. The receiver design provides the operator with an accurate time indication at predetermined time intervals. This information may be used to provide the operator with an accurate time rate for manually comparing the time rate of local marine chronometers in order to check the reliability and accuracy of their operation.

An object of the present invention is the provision of a compact receiver that permits the reception of accurate time signals from a navigational satellite system.

Another object of the present invention is the provision of a receiver that operates in conjunction with the navigational satellite that is inexpensive, small and is of simple design.

Still another object of the present invention is the provision of a receiver system apparatus that operates to automatically sound an alarm to indicate that a satellite is in the receiver vicinity and is available for providing time information.

Still another object of the present invention is the provision of a receiver system that is a completely self-contained unit for receiving time information from navigational satellites.

A further object of the present invention is the provision of a navigational satellite time recovery receiver that has an alert mode in which the receiver sweeps the frequency band in which the satellite signal may appear and when it locates the signal, sounds an alarm.

Still another object of the present invention is the provision of a navigational satellite time recovery receiver that requires little or no operator training time.

Another object of the present invention is to provide a receiver system that is utilized to provide a means of providing a time check on operating ship's chronometers.

Other objects, advantages and novel features of the invention will become apparent from the following detailed description of the invention when considered in conjunction with the accompanying drawings wherein.

Figure 1:
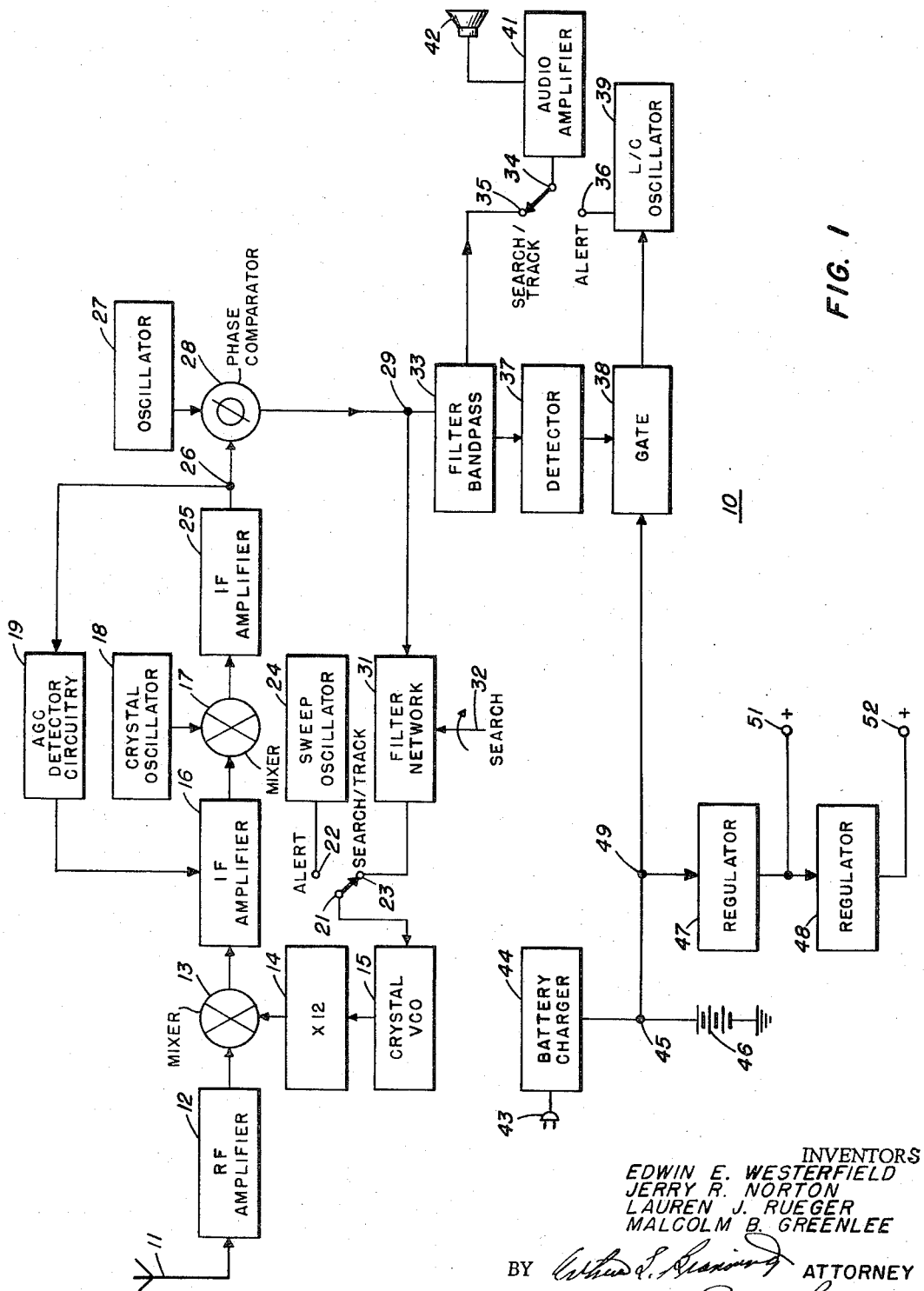
FIG. 1 illustrates a functional block diagram of the receiver system.

Present-day navigational systems using earth satellites transmit on a band of predetermined internationally assigned frequencies. A portion of the navigational information transmitted by these satellites is a reference time mark which is transmitted at predetermined fractional hour time intervals. The timing information is transmitted as phased modulation of the radio frequency carrier of the transmitter at a predetermined audio frequency rate. Other navigational information may be transmitted at other rates which are either higher or lower than the time information transmission rate. In this way, large amounts of information from the navigational satellite is possible without having interference between the different informations transmitted. The timing tone of the reference time signal is set to precisely start at the hour period and at a predetermined number of fractional hour intervals thereafter so that an operator of a satellite time receiver may observe the rate of passage of time from one mark to another and compare the time lapse between these marks with the time lapse of, for example, a ship's chronometer. In this way, the rate of a ship's chronometer may be accurately checked.

The receiver system illustrated generally as 10 according to the invention will be described first with reference to FIG. 1 which shows an overall functional block diagram of the receiver system and then later with reference to FIGS. 2 through 8, which illustrate the circuitry components contained within each of the functional blocks shown in FIG. 1. The receiver utilizes a small whip type antenna illustrated by antenna symbol designated as 11 to receive the input radio frequency signal from the navigational satellite. This antenna may be physically mounted on the receiver case or if the receiver is to be used in a closed building or location then the antenna may be connected to the receiver by means of a short length of coaxial cable. If the antenna is mounted externally of the receiver it is necessary to provide the antenna with a small ground plane. The radio frequency signal is coupled to functional block 12 which represents the radio frequency amplifier stages. The radio frequency amplifiers are constructed so as to provide low noise amplification. It is desirable in the instant receiver to obtain a low noise figure at the receiver's operating frequency. The amplified signal from the radio frequency amplifier block 12 is electrically coupled to a mixer stage 13. An additional input is coupled to the mixer from local crystal oscillator 15 and multiplier 14. The crystal oscillator 15 is a local oscillator which generates a frequency that is electrically coupled to functional block 14 and which represents three multiplier stages. The first multiplier multiplies the oscillator output signal by times three and the following two multipliers multiply this signal by times two each to give a total of times twelve multiplication of the frequency of the oscillator. The crystal oscillator for local oscillator 15 is a voltage controlled oscillator which may be varied in frequency a predetermined amount by a direct current control voltage. The multiple signal from multiplier functional block 14 is mixed with the signal obtained from the radio frequency amplifier, functional block 12, in the mixer 13 to obtain an intermediate frequency signal. This signal is coupled from the output of mixer 13 to the input of an intermediate frequency amplifier functional block 16. The output of the intermediate amplifier 16 is coupled to a second mixer stage represented by functional block 17. The local oscillator stage for this mixer is a crystal oscillator illustrated as functional block 18. This oscillator is a fixed oscillator whose frequency stability is controlled by a crystal. The local oscillator signal from oscillator 18 is fed to mixer 17 and is heterodyned with the intermediate frequency signal received from block 16 to give a second intermediate frequency. The output signal of mixer 17 is fed to this second intermediate amplifier illustrated as functional block 25. This amplifier provides amplification and the necessary bandwidth to the signal for providing good rejection of image frequencies. The output signal of block 25 is fed via junction 26 to a phase comparator block represented by 28. A second output is taken from IF amplifier 25 at junction 26 and coupled to IF amplifier block 16 via AGC detector circuitry 19. The AGC detector circuitry within functional block 19 is a full wave detector circuitry system with suitable filtering circuitry for providing a direct current signal to control the gain of intermediate frequency amplifier 16. The output signal from IF amplifier 25 is also taken from junction 26 and is coupled to the input of phase comparator functional block 28. The phase comparator compares the output of the IF amplifier block 25 by a reference input which is supplied by oscillator block 27. The phase comparator is essentially a device that multiplies the output of the IF amplifier 25 by the reference output of oscillator 27. If the input signal and the reference signal are at the same frequency a direct current voltage is obtained whose amplitude and phase is a function of the phase difference between the two 455 kilocycle signals. This output from the phase comparator is electrically coupled via junction 29 to a filter network block 31 which is a high gain operational amplifier with suitable resistance-capacitance feedback components to establish a desired transfer function. The output of the block 31 is fed via switch contact 23 and switch arm 21 to voltage controlled oscillator block 15 to provide a control voltage for shifting its frequency whenever switch 21 is connected in the search or track mode as shown. Whenever switch 21 is operated so as to be in the search/track mode, the frequency of crystal oscillator block 15 is controlled by a voltage input from search control 32. This control is mounted on the front panel of the receiver so that it can be manually varied by an operator and in this way may be used to search for the satellite signal. When the signal is found the search mode switch 32 is switched to the track position which removes the manual control 32 from the circuit and modifies the transfer function in the filter network within block 31 to maintain a frequency lock on the satellite signal with minimum phase error.

The output from the phase comparator 28 is also electrically coupled via junction 29 to filter bandpass functional block 33. The filter bandpass is a circuitry that provides a bandpass in the frequency range of the audio signal desired. The filter circuitry within block 33 is an active filter using a twin T network to control the filter frequency response. Its center frequency is tuned to the audio frequency desired and it has a predetermined bandwidth. The output of the filter block 33 is fed to audio amplifier 41 via switch contact 35 of switch 34. The audio amplifier circuitry amplifies the audio frequency and delivers the amplified signal to speaker 42 for providing an audible tone output for the operator.

The receiver system as heretofore explained was operating in the search or track mode. The receiver apparatus also has an alert mode of operation and in this mode the receiver automatically sweeps the frequency range over which a satellite signal may be received and emits an audible tone whenever a satellite signal is detected. In the alert mode switch 21 is thrown to the alert position 22. This permits a signal to be coupled to the crystal variable frequency local oscillator block 15 from sweep oscillator functional block 24. This oscillator permits the complete frequency range of the satellite transmitting frequency to be swept approximately twice every minute. Switch 34 is also operated in the alert mode by switching to contact terminal 36. As the range of satellite frequencies is swept by the receiver a signal present in this range of frequencies will be detected by causing an output from phase comparator 28. When the output from the phase comparator is at the audio center frequency of the filter bandpass block 33, it will be passed through the bandpass filter to the filter output that is coupled to detector block 37 where it will be detected by full wave detector circuitry. The output voltage of the detector 37 will actuate a gate circuitry 38 which is in the power control circuitry to cause direct current power to be connected to a low frequency oscillator block 39. This oscillator output signal is electrically connected to the audio amplifier 41 by means of contact 36 of switch 34. Thus an audible tone will be generated which will alert the operator to the fact that a satellite is overhead.

The receiver is powered by battery 46. A battery charger block 44 which is capable of being electrically connected to an alternating current source by means of plug 43 is electrically coupled across battery 46 from junction 45 to ground potential for maintaining battery 46 in a completely charged state. The output voltage from battery 46 is electrically coupled from junction 45 via junction 49 to the input of gate functional block 38. Regulators 47 and 48 are series coupled from junction 49 and these regulators provide direct current output voltages at terminals 51 and 52. The regulator and battery circuitry are well known to those skilled in the art and therefore will not be discussed in any detail.

Figure 2:
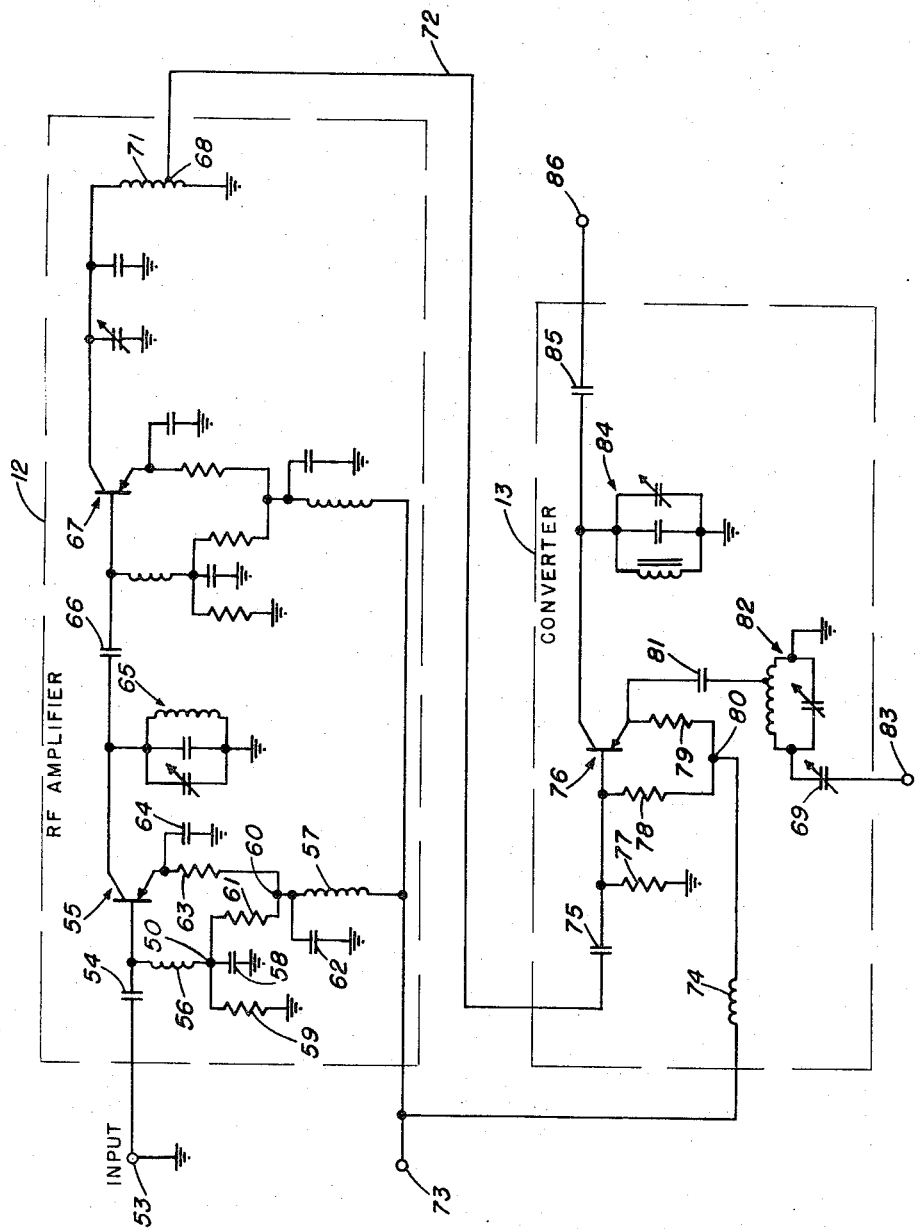
FIG. 2 illustrates a schematic diagram of the radio frequency amplifier and converter functional block diagrams.

Reference should now be made to FIG. 2 which shows a schematic diagram of the radio frequency amplifier functional block 12 and the mixer functional block 13 whose respective operations are briefly described in the following paragraphs.

A radio frequency signal input from the antenna 11 is connected to the input terminal 53 of the first radio frequency amplifier stage by means of a coaxial cable. The terminal 53 is electrically coupled to the base of transistor 55 via a coupling capacitor 54. Transistor 55 is connected in common emitter circuitry configuration and as shown has in the collector circuit output a parallel tuned circuitry 65 which is grounded at one side. Grounding of the tuned circuitry 65 simplifies its construction and also provides good circuit stability and maximum Q (figure of merit) factor. The bias voltage for transistor 55 is obtained from a voltage divider of two series connected resistors 59 and 61, respectively. This resistor network is coupled between ground and one side of emitter resistor 63 via junctions 50 and 60, respectively. The emitter resistance 63 and one side of resistor 61 are coupled from junction 60 to direct current potential line 73 by means of a decoupling network of inductance 57 and capacity 62. Inductance 56 provides a direct current path from junction 50 to the base of transistor 55 and bypass capacitance 58 connected from junction 50 to ground potential provides a low alternating curent impedance path to ground. Emitter capacity 64 is coupled from the emitter to ground potential. The bias circuitry configuration illustrated provides a fixed bias voltage for transistor 55 and also provides isolation of any noise generated by the resistors 59 and 61, respectively, from the base by means of inductance 56 and bypass capacitance 58. The amplifier input signal to the second radio frequency amplifier stage, transistor 67, is coupled to the base by means of coupling capacitance 66. Parallel tuned circuitry 65 provides the necessary output impedance at the desired signal frequency to match the input impedance of transistor 67.

Figure 5:
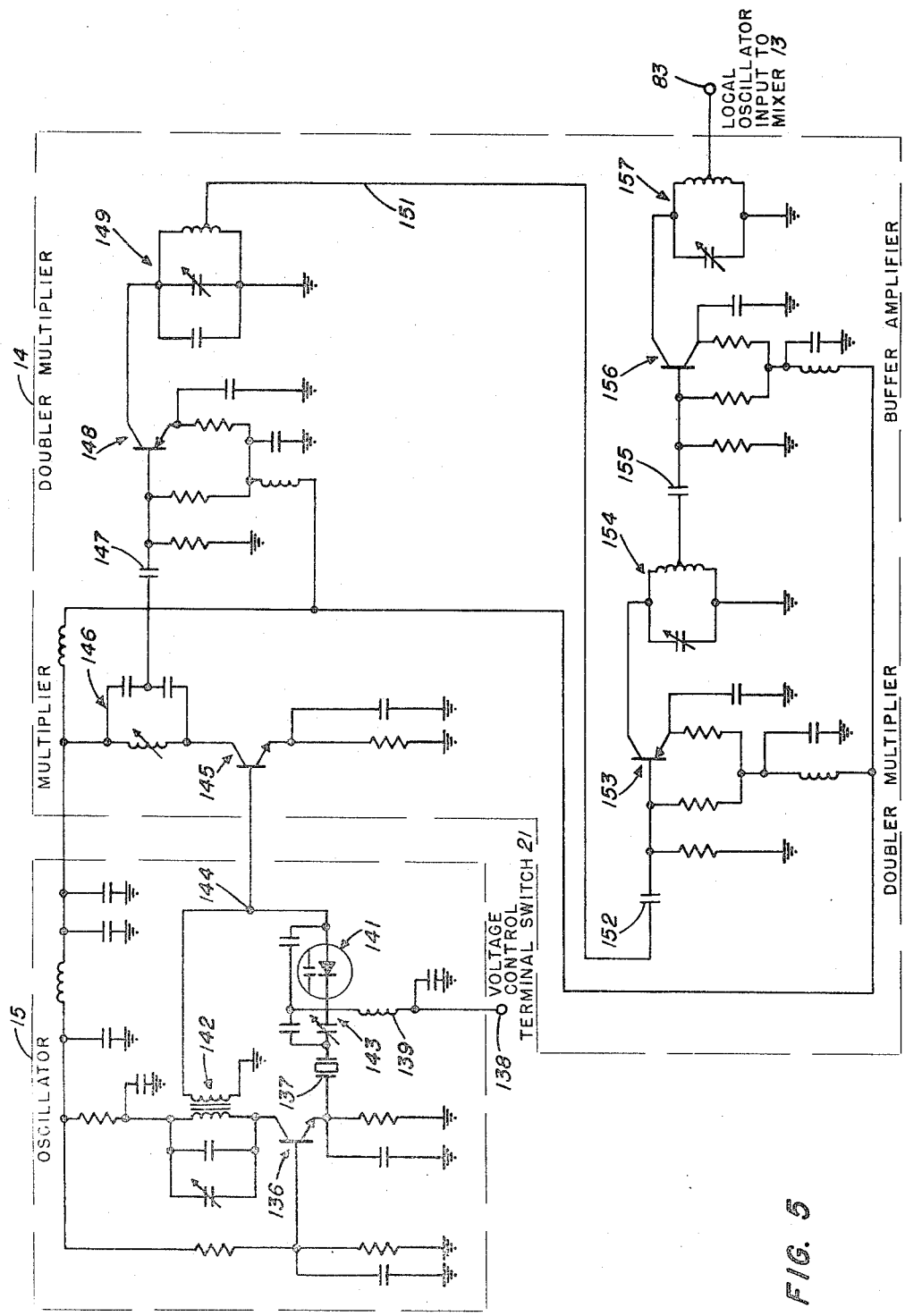
FIG. 5 illustrates the schematic diagram of the functional block labeled local oscillator generator.

Transistor 67 has essentially the same circuit configuration as the circuitry of transistor 55 except that its output circuitry is a parallel tuned circuit which is a capacitance-inductance and has a tapped inductance 71 which is tapped a predetermined number of turns above ground. The output signal from the collector of transistor 67 is fed across the parallel tuned circuit and is coupled to the following stage from across tap 68 to ground potential. This tapped inductance is to provide a low impedance to the input circuitry of transistor 76 and also to provide a low impedance path to the intermediate frequency signal between the base and emitter of transistor 76 thus providing good conversion gain characteristics to these stages. As illustrated, the output signal from radio frequency amplifier stage 67 is coupled to the base of transistor 76 from tap 68 via line 72 and coupling capacitor 75. Resistor 77 is an impedance matching resistor which is connected from the base to ground potential and provides a means to match the output impedance of inductor 71 and line 72. A bias resistor 78 is also connected to the base circuitry and this resistor has its other side connected to emitter resistance 79 via junction 80. An inductance 74 electrically connects junction 80 to direct current potential line 73 to provide decoupling from the power source. The local oscillator input signal from functional block 14, FIG. 5, is coupled to input terminal 83. Terminal 83 is electrically coupled to the emitter of transistor 76 by means of capacitance 81, tuned tank circuit 82 and variable capacitance 69. Tank circuit 82 is tuned to the local oscillator injection frequency and variable capacitance 69 and is used to impedance match the coaxial line cable impedance that is connected from terminal 83 to the local oscillator multiplier circuitry 14. The output of the mixer stage is fed to terminal 86 via coupling capacitance 85. Parallel tuned tank circuit 84 coupled from the collector of transistor 76 to ground potential via coupling capacitor 85 provides the proper impedance at the receiver's first intermediate frequency.

Figure 3:
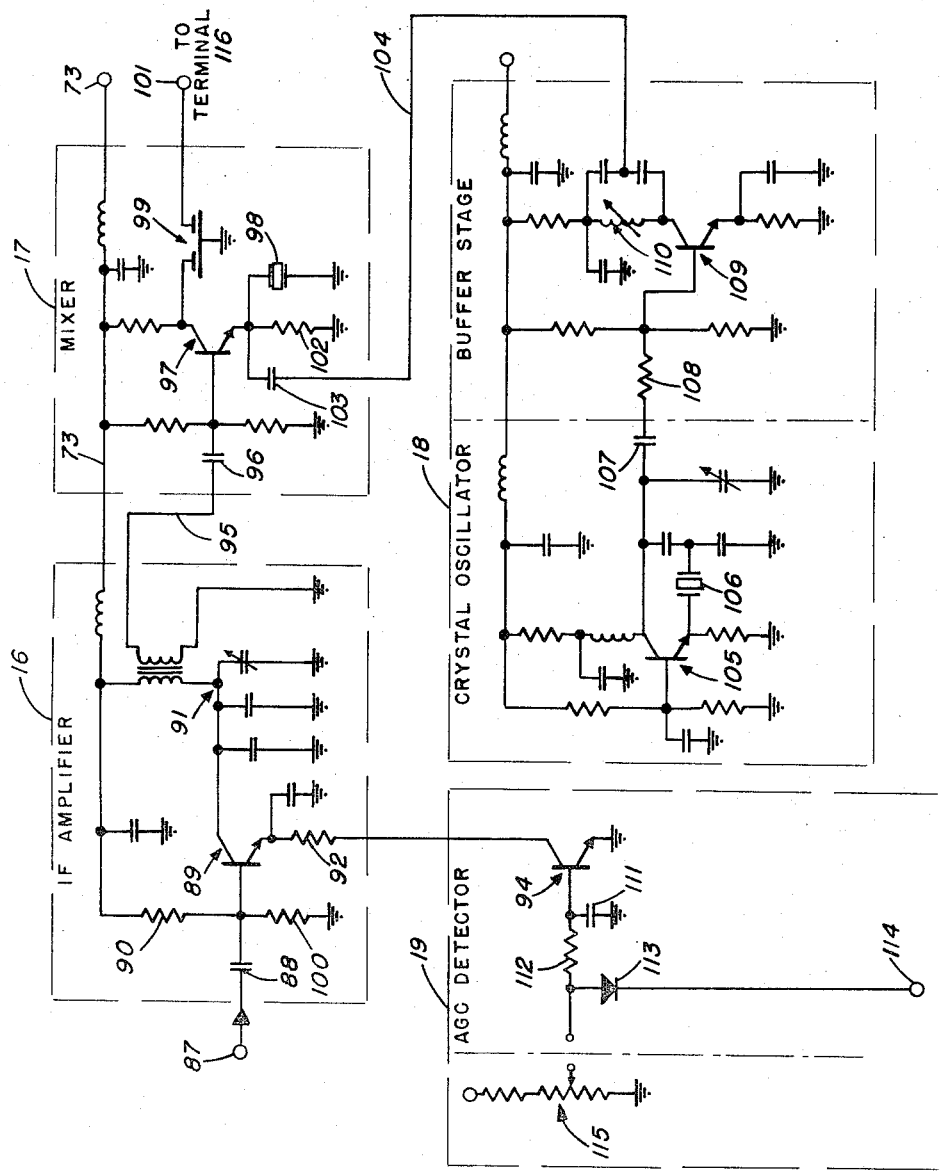
FIG. 3 illustrates the schematic diagram contained within the functional blocks of the intermediate frequency amplifiers and the mixer of the receiver.

Reference to FIG. 3 shows a schematic diagram of the intermediate frequency amplifier functional block 16, mixer functional block 17, and a portion of functional block 19 of the automatic gain control system circuitry. The output terminal 86 shown on FIG. 2 is electrically coupled to terminal 87 which in turn is coupled to base of transistor 89 via coupling capacitor 88. The base is controlled by a fixed bias that is provided by a voltage divider network of series connected resistors 90 and 100, which are connected between the direct current potential line 73, base of transistor 89 and ground potential. With the bias of this stage fixed the automatic gain control action is obtained by varying the collector current through transistor 89. This action is accomplished by the magnitude of the AGC voltage coupled to terminal 114 from the detector portion of the AGC circuitry (see FIG. 4). Terminal 114 is coupled to the base of transistor 94 via diode 113, and series resistance 112. A bypass capacitance 111 is connected from the base of transistor 94 to ground potential. Also one side of diode 113, the anode side, is coupled to potentiometer network 115 to manually vary the amount of direct current bias on the base of transistor 94. The collector of transistor 94 is electrically coupled to the emitter of transistor 89 by means of emitter resistance 92. The automatic gain control action provided by functional block 19 is a hybrid form of reverse gain control. With no signal input to the receiver antenna, hence no AGC voltage coming from the AGC circuitry (block 19) to terminal 114, transistor 94 is in a saturated condition providing full current and full gain to transistor 89 as the AGC voltage is developed by the AGC detector (see FIG. 4). Whenever an input signal is present in the receiver a voltage will be applied to terminal 114 and from there to the base of transistor 94 via diode 113 and resistance 112. The transistor 94 will come out of saturation and provide a higher impedance to the emitter of transistor 89 and will also decrease the collector current through transistor 89. The higher impedance presented to transistor 89 decreases its gain by emitter degeneration while the decreased collector current decreases the gain through reverse gain control action. This hybrid form of gain control action overcomes difficulties which would be experienced with reverse gain control, that is, the incapability of reverse gain control to handle large signals. The higher impedance caused by transistor 89 coming out of saturation overcomes this problem. Also, the hybrid AGC produces less center frequency shift of the intermediate frequency bandwith and provides a greater reduction in gain than with reverse gain control only. The AGC controlled output from the collector of transistor 89 is coupled to a transformer-capacitance network 91. This transformer by means of its secondary couples the voltage output to the base of transistor 97 via coupling capacitance 96 and lead 95. The input signal is applied to the base of transistor 97 while the local oscillator signal from functional block 18 is injected into the emitter via capacitance 103.

The second local oscillator frequency is generated by means of a crystal controlled oscillator circuitry shown generally as block 18. This crystal controlled oscillator circuitry has transistor 105 connected in circuitry configuration with crystal 106 which controls the frequency of oscillation of this circuitry. The output of the oscillator is coupled to the base of transistor 109 by means of coupling capacitance 107 and series resistance 108. Transistor 109 represents a buffer amplifier stage that has its output coupled from the collector of transistor 109 to parallel tuned circuitry 110. The buffer amplifier is utilized between the oscillator transistor 105 and the mixer transistor 97 to provide greater oscillator stability and isolation from the oscillator signal source. The amplified oscillator signal is coupled from the tank circuitry network 110 of the buffer amplifier to the emitter of transistor 97 via coupling capacitance 103 and electrical lead 104. Emitter resistance 102 is connected from the emitter to ground potential and connected in parallel relationship with this emitter resistance is a ceramic resonator 98. This ceramic resonator provides a very low impedance to the intermediate frequency signal while presenting a high impedance to other frequencies. The ceramic resonator 98 is used to replace the emitter bypass capacitor and also provides a degree of selectivity to the circuitry not attainable with a bypass capacitance. The output signal is coupled from the collector of transistor 97 to terminal 101 by means of another ceramic resonator 99. This ceramic resonator 99 is similar to ceramic resonator 98 but provides impedance transformation between this stage and the following stage. The ceramic resonators are circuit components that are fixedly tuned at predetermined frequencies and they maintain good stability characteristics with age and temperature and in many respects have characteristics similar to crystals and crystal filters.

Figure 4:
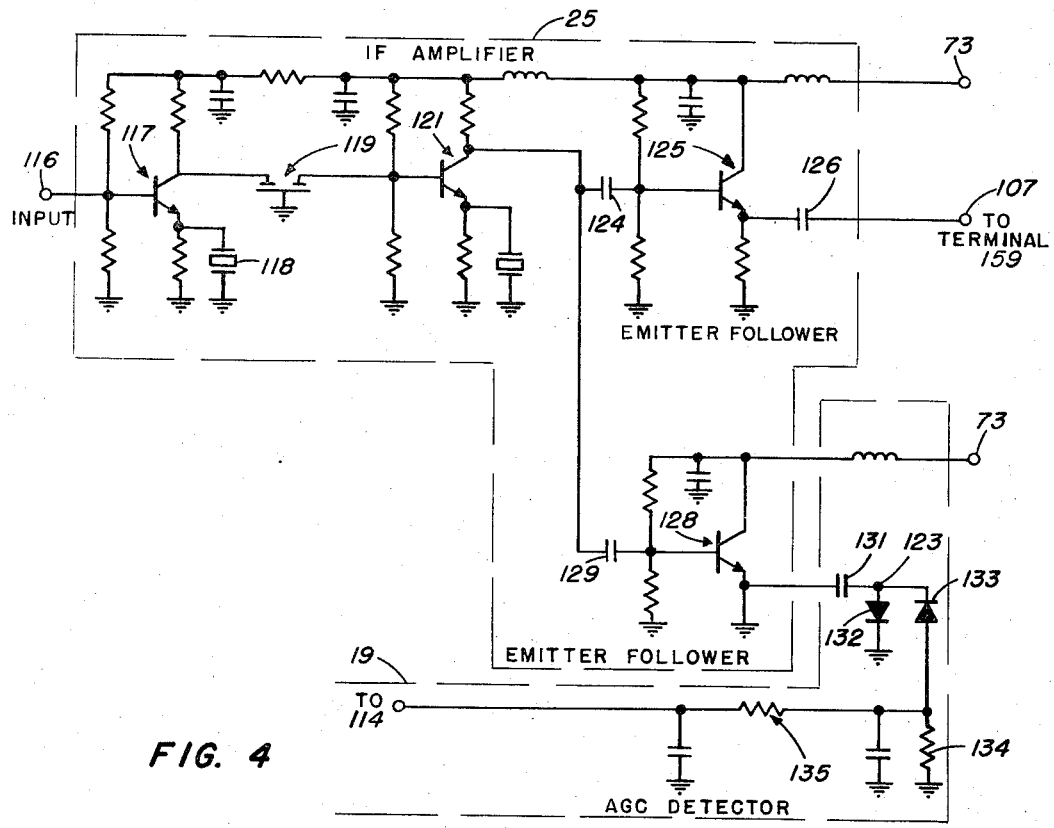
FIG. 4 illustrates the schematic diagram of the intermediate frequency amplifier functional block.

Referring now to FIG. 4, which shows a schematic diagram of the intermediate frequency amplifier functional block and the automatic gain control detector functional block illustrated as numerals 25 and 19, respectively. A signal input to terminal 116 is electrically coupled from the mixer output terminal 101. The base of intermediate amplifier stage, illustrated as transistor 117, is electrically coupled to receive the signal at its base from terminal 116. This intermediate amplifier stage uses a transfilter 118 electrically coupled from the emitter to ground potential and a transfilter 119 which is electrically coupled from collector to ground potential. The advantages of using this type of circuitry element has been explained above. The base of transistor 121 is electrically coupled to receive the output from transistor 117 via transfilter 119. The intermediate frequency amplifier circuitry of transistor 121 is of similar circuitry configuration as the intermediate frequency amplifier stage circuitry of transistor 117. The output of transistor 121 is electrically coupled from the collector to two emitter follower stages illustrated as transistors 125 and 128, respectively. The base of emitter follower stage 125 is electrically coupled to the collector of transistor 121 via coupling capacitor 124. The output signal from emitter follower stage, illustrated as transistor 125, is electrically coupled from its emitter to output terminal 107 via coupling capacitor 126. The second emitter follower stage, illustrated as transistor 128, has its base electrically coupled to the collector of the intermediate amplifier, illustrated as 121, via coupling capacitor 129. The output is electrically coupled to junction 123 from the emitter via coupling capacitor 131.

Diode 132 has its anode electrically coupled to terminal 123 and its cathode coupled to ground potential. Another diode 133 has its cathode electrically coupled to junction 123 and its anode coupled to ground via load resistance 134. A filter resistive-capacitance network is electrically coupled across load resistance 134 on one side and is electrically coupled to terminal 114 at its other. The two diodes operate to provide a rectified direct current through load resistance 134. This current is filtered by filter network 135 and is coupled to terminal 114 to operate transistor 94 so as to provide proper AGC control voltage for the intermediate frequency amplifier stage 16. The operation of this AGC voltage which is a hybrid form of reverse gain control is given in more detail by reference to the explanation of the operation of the AGC circuitry with respect to intermediate frequency amplifier stage 16.

The following explanation may best be understood with reference to FIG. 5 which illustrates the schematic diagram of functional oscillator block 15 and functional frequency multiplier block 14. Transistor oscillator circuitry illustrated as transistor 136 has its emitter electrically coupled to crystal 137 which in turn is electrically coupled through variable capacitance 143 to diode 141. Crystal 137 is utilized to provide a single frequency signal and provides good oscillator frequency stability. One side of diode 141 is electrically coupled to a transformer 142 via junction 144. This effectively grounds the diode through the secondary of transformer 142. The capacity change of diode 141 will change the operating point of the crystal and therefore, the operating signal frequency which is put out by transistor 136. The variable capacitance 143 which is coupled between diode 141 and crystal 137 provides a means of tuning the crystal oscillator to the desired center operating frequency. A control voltage terminal 138 is electrically coupled to a split capacitance network, coupled across diode 141 and capacitance 143, through an inductance 139. The function of this control voltage will be explained later. The output of the oscillator is coupled to the base of transistor 145 via junction 144. This transistorized stage operates as a times three multiplier of the oscillator signal frequency input. The stage is operated as a class C multiplier and the output is taken from the collector to the base of transistor 148 via a parallel tuned circuitry arrangement 146 and coupling capacitor 147. Tuned circuitry 146 has a split capacitance arrangement which is used to couple the output to the base of transistor 148. The output of transistor 148 is coupled from its collector to parallel tuned circuitry network 149. This parallel tuned circuitry network 149 has a tapped inductance to provide a low impedance match to the next stage. Transistor 148 operates as a doubler multiplier circuitry that provides an output frequency which is double its input frequency. The output is coupled to the base of transistor 153 via electrical lead 151 and coupling capacitance 152. The output of transistor 153 is coupled by means of its collector to a parallel tuned circuitry network 154 which has its inductance tapped a predetermined number of turns above ground. Coupled to the tap via coupling capacitance 155 is the base of transistor 156. The output of transistor 153 which appears from the tap to ground potential is double its input frequency. Transistor 156 has its collector coupled to a parallel tuned circuitry network 157 which has a tapped inductance which is connected to the output terminal 83. Transistor 156 operates as a buffer amplifier stage and provides the necessary isolation between the multiplier stages and the mixer stage 13. The output appearing from terminal 83 to ground potential is of a signal level and proper frequency to provide adequate conversion gain and a low noise figure signal from the mixer stage 13 (FIG. 2, block 13).

Figure 6:
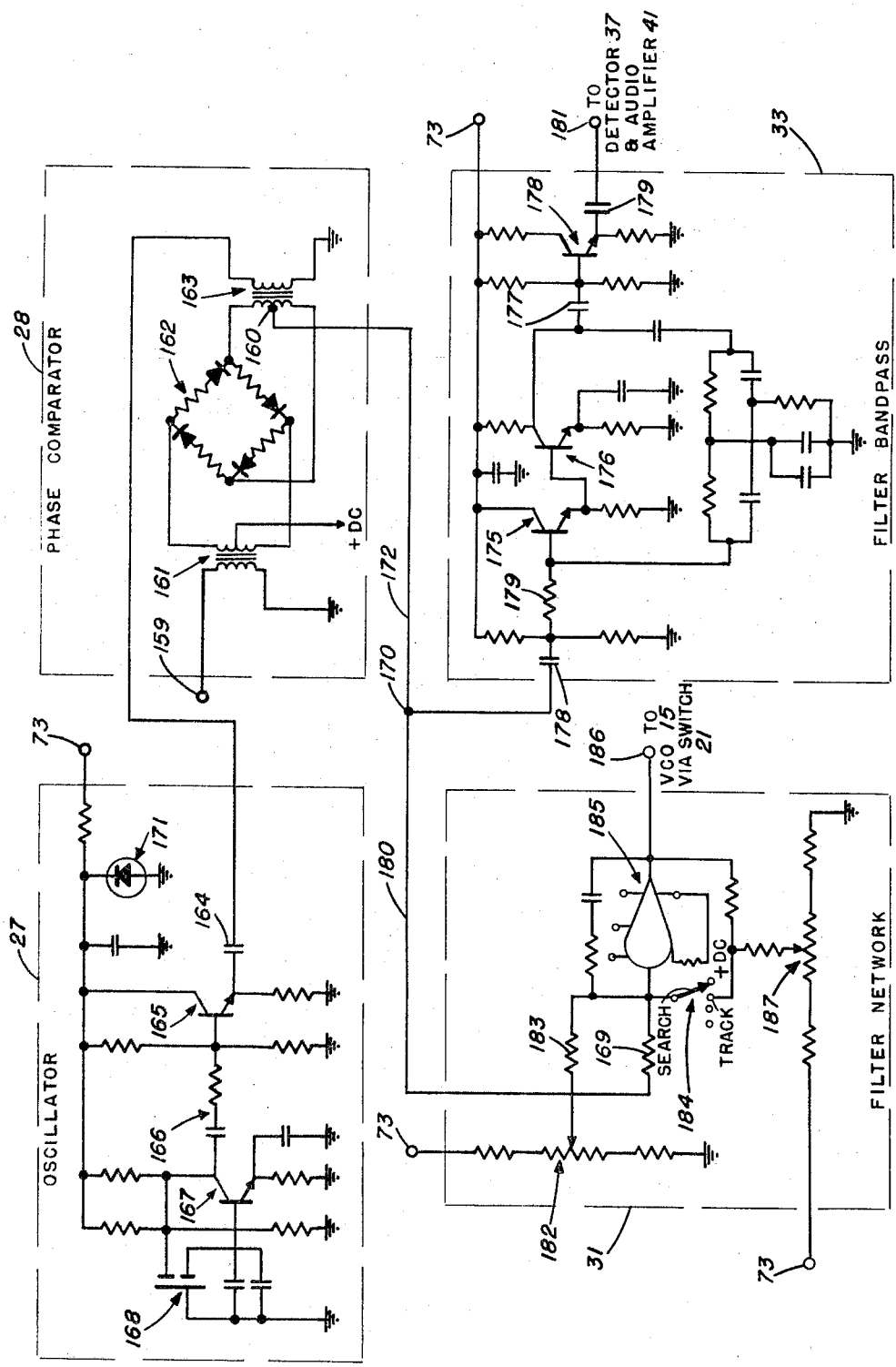
FIG. 6 illustrates a schematic diagram of the control circuitry of the receiver system.

The following explanation may be best understood with reference to FIG. 6 which illustrates the control circuitry for the time receiver apparatus. The phase comparator functional block 28 has an input terminal 159 which is electrically coupled to receive the output from emitter follower output terminal 107, best illustrated by reference to FIG. 4. Input terminal 159 is electrically coupled to bridge circuitry 162 by means of a coupling transformer 161. A reference frequency oscillator signal is also fed across the bridge 162 by means of oscillator functional block 27. Oscillator 27 is a transistorized circuit that uses transistor 167 coupled to transfilter 168. Transfilter 168 is used in place of a crystal and provides the frequency control necessary for the oscillator. The transfilter 168 also provides adequate stability and is much smaller and less expensive than a crystal. The output voltage from the collector of transistor 167 is electrically coupled to the base of transistor 165 by means of a resistance-capacitance network 166. Transistor 165 operates as an emitter follower and has its emitter electrically coupled via capacitance 164 to transformer 163. The Zener diode 171 is electrically connected between the positive potential line 73 and ground potential to provide the necessary stability to the oscillator because of the extreme sensitivity of transistor 167 to collector voltage variation. Transformer 163 has a tapped winding illustrated as junction 160. The signal coming from junction 159 is compared in phase with the reference signal frequency of oscillator 27 in phase comparator 28 and the output of the phase comparator at junction 160 is directly proportional to the phase difference between these two signals and in both frequency, phase and amplitude.

The output of the phase comparator is coupled to junction 170 by means of electrical lead 172. Coupled to junction 170 by means of electrical lead 180 is a resistive input network of resistors 169, 183, and potentiometer 182. Electrically coupled to one side of resistors 169 and 183 is switch 184. Also electrically coupled to the switch terminals of switch 184 is a variable potentiometer resistive network 187. The switch and potentiometer 187 are used to provide a suitable transfer function to operational amplifier 185 which is an operational amplifier of such circuitry known to one skilled in the art. The output from operational amplifier 185 is electrically coupled to output terminal 186. The output from terminal 186 is electrically coupled to variable control oscillator 15 via switch terminal 23 on switch 21 best illustrated by reference to FIG. 1.

The output of phase comparator functional block 28 is coupled to the filter bandpass functional block 33 by means of the electrical connection of junction 170 to the base of transistor 175 via coupling capacitance 178 and series resistance 179. The output of transistor 175 is directly coupled from its emitter to the base of transistor 176. The output of transistor 176 is coupled from its collector to the base of transistor 178 via coupling capacitance 177. The signal output of transistor 178 is coupled from its emitter to output terminal 181 via coupling capacitance 179. This circuitry configuration of transistors 175, 176 and 178 comprises an active bandpass filter. The bandpass frequency of this filter is centered at a predetermined audio frequency. The output of filter circuitry 33 is coupled from terminal 181 to the audio amplifier 41, FIG. 7, via switch 34 and switch contact 35.

Figure 7:
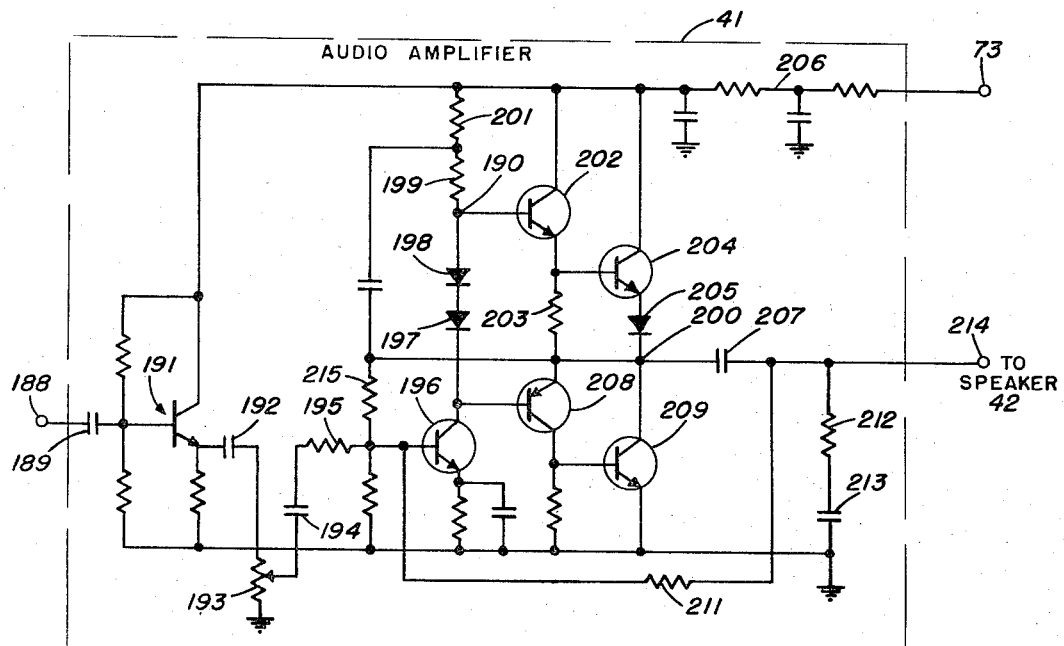
FIG. 7 illustrates a schematic diagram of the audio amplifier functional block.

The details of the following description may be best understood by reference to FIG. 7 which illustrates a schematic diagram of the audio amplifier illustrated as functional block 41. An input signal is coupled from switch terminal 34 to input terminal 188. The base of transistor 191 which operates as an emitter follower stage is electrically coupled to receive the input signal from terminal 188 via coupling capacitor 189. The output signal from transistor 191 is taken from its emitter and electrically coupled to ground via coupling capacitance 192 and potentiometer 193. This emitter follower stage is necessary to prevent loading of the bandpass filter circuitry 33. Potentiometer 193 has an adjustable arm that is manually operated by the receiver operator and is a means for controlling the volume. The output of volume control 193 is fed to the base of transistor 196 via coupling capacitance 194 and series resistance 195. Transistor 196 provides a voltage amplification of the input signal and this amplified signal is electrically coupled from the collector of transistor 196 to the base of transistor 208 and also through a diode-resistance network of diode 197, diode 198, junction 190, resistor 199, and resistor 201. Electrically coupled from junction 190 is the base of transistor 202. The diodes 197 and 198 in the collector circuit of transistor 196 provide bias for transistors 202 and 208, respectively. Transistors 202 and 208 are used as audio driver stages and also to provide for inversion for providing signals 180 degrees out of phase to the bases of transistors 204 and 209. These respective transistors have their bases electrically coupled to the emitter and collector, respectively of transistors 202 and 208. Diode 205 which is electrically coupled between emitter of transistor 204 and the collector of transistor 205 via junction 200 is used as temperature and voltage offset compensation for transistor 208. The output of the amplifier is electrically coupled from junction 200 to speaker terminal 214 via coupling capacitance 207. This signal appears across terminal 214, resistance 212 and capacitance 213 to ground potential. A feedback circuitry is electrically coupled from the terminal 214 through resistance 211 to the base of transistor 196. Resistance 211 provides a negative feedback which in conjunction with resistance 215 controls the overall gain of the amplifier stage. The audio amplifier is coupled directly to the direct current positive potential line 73 by means of decoupling resistive-capacitance network 206.

Figure 8:
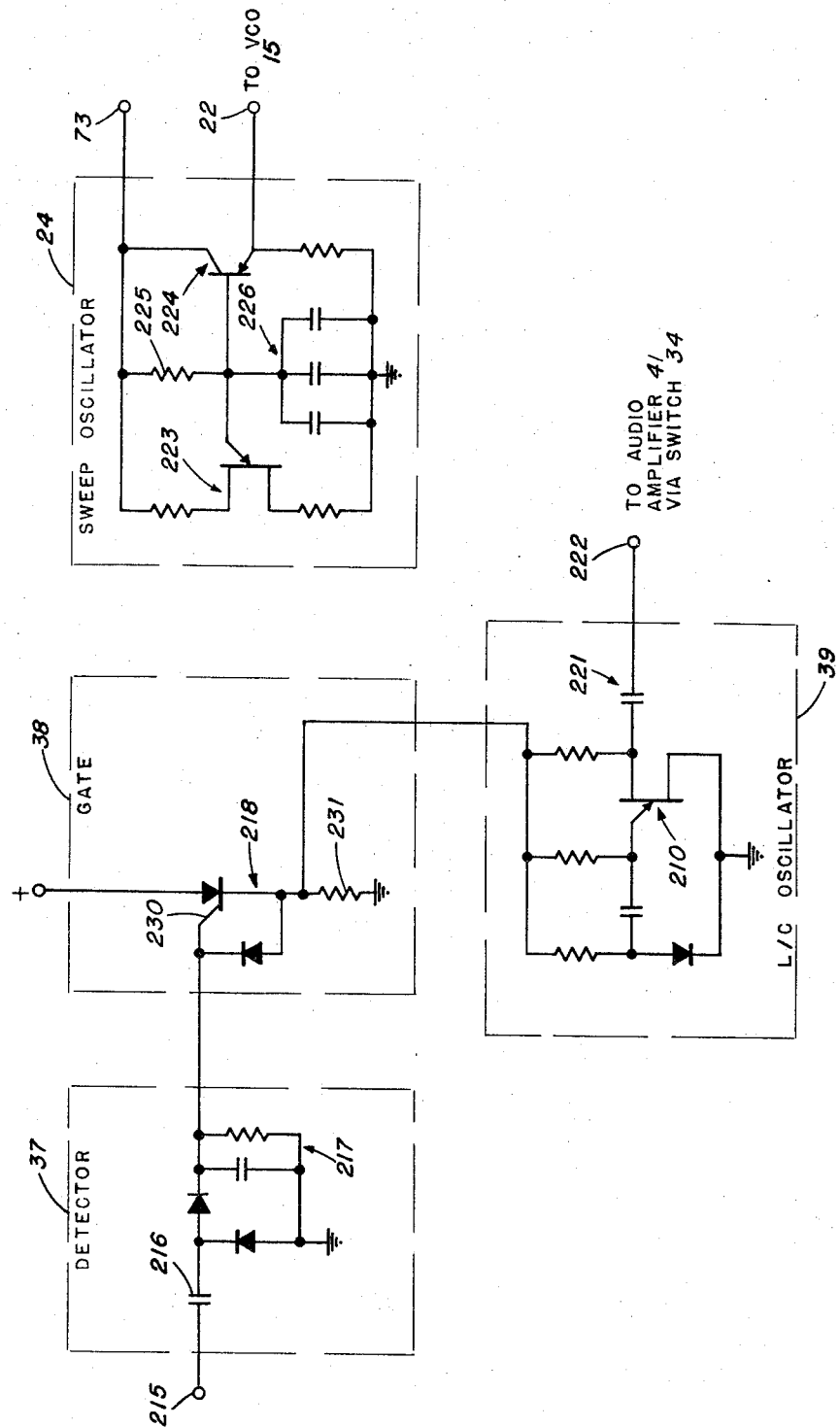
FIG. 8 illustrates a schematic diagram of the alert circuitry functional block and the sweep oscillator functional block.

Referring now to FIG. 8 with reference to the following detailed description of the alert detector circuitry, gate circuitry, and low frequency oscillator illustrated as functional blocks 37, 38 and 39, respectively. The output signal from the filter bandpass functional block 33 is coupled from its output terminal 181 to the input terminal of functional block 37 illustrated as terminal 215. Input terminal 215 is coupled to a diode resistive-capacitive network 217 via coupling capacitor 216. This circuitry is a full wave detector and operates upon receiving an increase in signal voltage whenever the output frequency from the phase comparator goes through the predetermined frequency bandwidth of filter functional block 33. This increase in signal voltage will appear across diode resistance-capacitance network 217 and will be rectified and a direct current voltage rise will appear at the gate of the silicon control rectifier 230. The silicon control rectifier circuitry is illustrated as functional block 38 and the circuitry itself is designated generally as 218. The voltage on the gate of the silicon control rectifier 230 will trigger it and the voltage will appear across resistance 231 to ground potential. This voltage is coupled to a low frequency oscillator circuitry illustrated as unijunction transistor 210. The unijunction oscillator circuitry consists of a unijunction transistor connected in oscillator configuration with the resistive and capacitive components necessary to provide a fixed frequency of oscillation. The output of circuitry 210 is coupled to terminal 222 via coupling capacitor 221. Terminal 222 in turn is fed through function switch 34 via switch terminal 36 which is in turn coupled to audio oscillator 41. The function of this circuitry is to produce a tone in speaker 42 whenever a signal from the satellite is being received by the circuitry apparatus.

Reference should now be made to FIG. 1 and FIG. 8. FIG. 1 shows the inner connection of the sweep oscillator functional block 24 in the receiver apparatus, whereas, FIG. 8 shows the sweep oscillator circuitry of functional block 24. The sweep voltage is generated by means of unijunction circuitry 223 which has its output electrically coupled to the base of an emitter follower circuitry illustrated as transistor 224. The output voltage is electrically connected from emitter of transistor 224 to output terminal 22 which is a switch terminal of switch 21; this coupling best shown by reference to FIG. 1. The emitter follower circuitry prevents loading of the unijunction transistor and the period of the sweep of the generator is determined by the respective values of series resistance 225 and capacitance network 226.

The general operation of the receiver system may be best understood with reference to the following description and with reference to FIGS. 1 and 6. The receiver is initially tuned to a particular frequency in its band of frequency operation in similar manner as any other receiver. The switches 21 and 34 are operated so as to be in the search positions and this permits control 32 to be utilized to make a manual search for the satellite signal if desired. These switches 21 and 34 also initiate the track mode wherein the receiver will automatically track a signal from the satellite and properly decode the modulation. When the switch is in the search/track position and is in the search mode, the output voltage of the operational amplifier 185 in functional block 31 will control the frequency of the local oscillator illustrated as functional block 15. This variable crystal oscillator is controlled principally by the use of this voltage which is obtained from the potentiometer 187 designated as the VCO frequency control. In this position, the incoming signal to the receiver is searched for and is located by listening for a zero beat from the receiver speaker. Initial receiver phase locking can occur when the receiver is still in the search mode due to the output from phase comparator functional block 28 causing the receiver to lock to the received signal. This is caused by the phase comparator supplying current through resistor 183, FIG. 6, to the operational amplifier circuitry 185 thus changing the local oscillator illustrated as 15 in the appropriate manner causing phase lock to be maintained on the receiver input signal. Once either zero beat or an initial lock on the signal has been obtained, the receiver is switched over to the tracking mode by operation of switch 184.

In the tracking mode the feedback circuitry of operational amplifier 185 as well as the VCO frequency control 187 is disconnected from the operational amplifier by switch 184. The feedback circuitry then becomes a resistive-capacitance combination. The circuit is phase locked to the incoming signal by the voltage output of the phase comparator illustrated as block 28 by being fed through the operational amplifier circuitry 185 with its associated components that control its transfer function to the voltage control oscillator illustrated as functional block 15. The oscillator frequency is varied in this manner to maintain a phase lock on the receiver input signal. The transfer function produced by the operational amplifier circuitry 185 is one of such a nature as to provide no phase error under static conditions.

To operate the receiver apparatus in the alert mode switches 21 and 34 are thrown to contacts 22 and 36, respectively. The sweep oscillator functional block 24 provides a magnitude of voltage to the variable crystal oscillator that causes it to sweep over a predetermined frequency range above and below the frequency to which the receiver is tuned by a given number of sweeps per minute. Whenever a satellite signal is picked up it is processed through the associated receiver circuitry to the gate circuitry, illustrated as functional block 38, to activate low frequency audio oscillator functional block 39 so that an audible note is produced through speaker 42. When the audible signal sounds, indicating to the operator that a satellite is in range, the function switches 21 and 34 are thrown to the search position and the frequency dial of the receiver is operated until a high pitch signal is heard. The frequency dial control should then be adjusted to zero beat this tone. If the lock on of the receiver on the input signal is successful, a low frequency buzz will be heard. Then it is only necessary to wait for an audible "beep" tone which indicates the beginning of a time interval period and this signal will be repeated at fractional hour periods until the overhead satellite passes out of range.

The present invention provides an effective self-contained apparatus that is capable of obtaining time information from navigational satellites and which may be utilized to obtain this time information anywhere in the world. The receiver is tunable over the internationally assigned band of frequencies that are designated for navigational satellites and is also equipped with an alert mode that permits the receiver to sweep a narrow band of frequencies above and below the receiver frequency tuned to locate a satellite signal. Once the signal is located an alarm sounds to notify the operator of the receiver that a satellite is in the receiving range. The receiver then may be switched to track mode to lock on the navigational signal and permit the receiver local oscillator to be varied to maintain a frequency lock on the satellite signal with a minimum of phase error. In addition the receiver is equipped with a filter arrangement that permits more reliable operation under adverse environmental conditions and with inexperienced operating personnel.

Obviously many modifications and variations of the present invention are possible in the light of the above teachings. It is therefore to be understood that within the scope of the appended claims the invention may be practiced otherwise than as specifically described.

What is claimed is:

1. A receiver apparatus for receiving transmitted electromagnetic information from navigational satellites and converting the received information into intelligible signals comprising radio frequency amplifier means for receiving and amplifying said electromagnetic information first mixer means coupled to receive the amplified signal of said radio frequency amplifier variable crystal oscillator means electrically coupled to said first mixer means for providing a first intermediate frequency signal output second mixer means electrically coupled to receive said first intermediate signal and heterodyne said intermediate signal with a fixed reference frequency to produce a second intermediate frequency output phase comparator means coupled to said second mixer means for comparing the second intermediate frequency signal to a reference signal with respect to phase, frequency and amplitude a first switching means having a first position and a second position;

tracking circuitry means coupled from the output of said phase comparator to said variable crystal oscillator via the first position on the first switching means sweep means coupled to the second position of said first switch means for providing a voltage input that causes said variable crystal oscillator to vary predetermined frequency amounts above and below the crystal frequency for providing automatic tuning an audio means for producing an audible signal;

second switch means having an arm and first and second positions, said second switch coupled to the audio means via said arm said tracking circuitry means coupled from the output of said phase comparator to said audio means via the first position on the second switching means; and alert circuitry means electrically coupled to said second position of said second switch means whereby the receiver apparatus may be operated in a search mode to detect the presence of an overhead satellite by sounding an audible signal and switched to a second position to track the satellite signal whenever the satellite is overhead.

2. The receiver apparatus of claim 1 wherein said radio frequency amplifier means comprises transistor means having base, emitter and collector, said emitter coupled to ground potential through first, second and third resistors choke means electrically coupling one side of said second and third resistors to said base of said transistor means and bypass means electrically coupled from one side of said choke means to ground potential whereby the choke means and bypass means prevent resistance noise from being amplified through the transistor thereby providing a low noise radio frequency amplifier circuitry.

3. The receiver apparatus of claim 1 wherein said variable crystal oscillator means comprises transistor means having base, emitter and collector, said emitter coupled to fixed frequency generating means diode means electrically coupled to a variable voltage source for changing the frequency output of said transistor means in response to voltage variation multiplier means electrically coupled to the output of said diode means for increasing the frequency by predetermined amounts and buffer amplifier means electrically coupled to the output of said multiplier means for providing isolation of the output frequency from said transistor means.

4. The receiver apparatus of claim 1 wherein said second mixer means comprises feedback circuitry means coupled between said mixer output and its input, said feedback circuitry having detector means for providing full wave rectification of said output and variable impedance means coupled to said input for providing gain control action that effectively handles large signal inputs.

5. The receiver apparatus of claim 1 wherein said tracking circuitry means comprises operational amplifier means having first and second feedback means, switch means electrically coupled to the input of said operational amplifier for providing feedback voltages that vary the gain of said operational amplifier whereby the output voltage of said operational amplifier generates a magnitude of voltage output that varies in accordance with the transfer function provided by said first and second feedback means.

6. The receiver apparatus of claim 1 wherein said sweep means comprises a sweep oscillator having first and second transistors and a tuning network electrically coupled between said first and second transistors for providing voltage output that varies from a minimum to a maximum within a predetermined time period.

7. The receiver apparatus of claim 1 wherein said alert circuitry comprises filter bandpass means for providing a magnitude of voltage output which is dependent upon a predetermined frequency of said bandpass means detection means coupled to receive the output voltage from said bandpass means for providing a direct current output gate means electrically coupled to said detection means and oscillator means electrically coupled to said gate means for providing a fixed frequency output upon triggering of said gate means.

8. The alert circuitry of claim 7 wherein said filter means comprises first, second and third transistors and filter network means electrically coupled to receive signals from said first, second and third transistors.

9. The alert circuitry of claim 7 wherein said gate means comprises a silicon controlled rectifier that supplies direct current power to said oscillator means on receipt of a direct current signal from said detector.

References Cited
UNITED STATES PATENTS

| | | | |
|---|---|---|---|
| 1,923,430 | 8/1933 | Fanning | 325—364 |
| 2,951,150 | 8/1960 | Rennenkampf | 325—420 |
| 3,007,044 | 10/1961 | Cookson | 325—453 |
| 3,041,451 | 6/1962 | Laing et al. | 325—470 |
| 3,063,048 | 11/1962 | Lehan et al. | 343—100 |

RICHARD A. FARLEY, *Primary Examiner.*

RODNEY D. BENNETT, *Examiner.*

H. C. WAMSLEY, *Assistant Examiner.*